United States Patent
Zhai (10) Patent No.: US 11,488,178 B2
(45) Date of Patent: Nov. 1, 2022

(54) SYSTEMS AND METHODS FOR VERIFYING DIGITAL PAYMENTS

(71) Applicant: BEIJING DIDI INFINITY TECHNOLOGY AND DEVELOPMENT CO., LTD., Beijing (CN)

(72) Inventor: Jinjian Zhai, Mountain View, CA (US)

(73) Assignee: BEIJING DIDI INFINITY TECHNOLOGY AND DEVELOPMENT CO., LTD., Beijing (CN)

(*) Notice: Subject to any disclaimer, the term of this patent is extended or adjusted under 35 U.S.C. 154(b) by 41 days.

(21) Appl. No.: 17/086,448

(22) Filed: Nov. 1, 2020

(65) Prior Publication Data

US 2022/0138768 A1 May 5, 2022

(51) Int. Cl.
*G06Q 30/00* (2012.01)
*G06Q 10/10* (2012.01)
(Continued)

(52) U.S. Cl.
CPC ......... *G06Q 30/0185* (2013.01); *G06F 21/31* (2013.01); *G06N 20/00* (2019.01);
(Continued)

(58) Field of Classification Search
CPC ........... G06Q 30/0185; G06Q 20/4015; G06Q 10/10; G06Q 20/02; G06Q 20/3224; G06Q 20/40145; G06N 20/00; G06F 21/31
(Continued)

(56) References Cited

U.S. PATENT DOCUMENTS 10,965,668 B2 * 3/2021 Caldera .................. H04L 67/22
10,997,609 B1 * 5/2021 Wang .................. G06K 9/00617
(Continued)

FOREIGN PATENT DOCUMENTS

CN 112184241 A * 1/2021

OTHER PUBLICATIONS

"Payments, Processors, & FinTech If Software Is Eating the World . . . Payments Is Taking a Bite", Credit Suisse, Source: Company reports, FactSet, Credit Suise research, Jan. 24, 2020, 261 pages.
(Continued)

*Primary Examiner* — Sara C Hamilton
(74) *Attorney, Agent, or Firm* — Bayes PLLC (57) ABSTRACT

Embodiments of the disclosure provide systems and methods for verifying digital payments for a payment platform. The system includes a communication interface configured to receive service data associated with a transaction from a terminal device associated with a user of the payment platform. The system further includes at least one processor configured to automatically determine whether an authentication is waived for the transaction based on the received service data and a blacklist generated using a machine learning model. The blacklist includes a list of suspicious users and transaction behaviors. The at least one processor further configured to approve the transaction without requesting user authentication information from the terminal device when the authentication is waived. The at least one processor also configured to request the user authentication information from the terminal device and validate the user authentication information when the authentication is not waived.

20 Claims, 7 Drawing Sheets

(51) Int. Cl.
 G06Q 20/40 (2012.01)
 G06Q 20/02 (2012.01)
 G06N 20/00 (2019.01)
 G06F 21/31 (2013.01)
 G06Q 20/32 (2012.01)
 G06Q 50/26 (2012.01)
 G06Q 40/02 (2012.01)

(52) U.S. Cl.
 CPC ............. *G06Q 10/10* (2013.01); *G06Q 20/02* (2013.01); *G06Q 20/3224* (2013.01); *G06Q 20/4015* (2020.05); *G06Q 20/40145* (2013.01); *G06Q 40/02* (2013.01); *G06Q 50/265* (2013.01)

(58) Field of Classification Search
 USPC .......................................................... 705/44
 See application file for complete search history.

(56) References Cited

U.S. PATENT DOCUMENTS

| | | | | |
|---|---|---|---|---|
| 11,080,617 | B1* | 8/2021 | Bansal | G06F 16/235 |
| 11,210,670 | B2* | 12/2021 | Loganathan | H04L 63/0876 |
| 2015/0039513 | A1* | 2/2015 | Adjaoute | H04L 63/1425 705/44 |
| 2016/0110528 | A1* | 4/2016 | Gupta | H04W 12/06 726/19 |
| 2016/0239649 | A1* | 8/2016 | Zhao | H04W 12/06 |
| 2019/0114404 | A1* | 4/2019 | Nowak | H04W 12/06 |
| 2020/0402066 | A1* | 12/2020 | Yokes | G06Q 20/3278 |
| 2021/0004807 | A1* | 1/2021 | Joao | G06Q 20/4093 |
| 2021/0019385 | A1* | 1/2021 | Stein | G06F 21/32 |
| 2021/0019657 | A1* | 1/2021 | Wu | G06Q 30/0185 |
| 2021/0049597 | A1* | 2/2021 | Kumra | G06Q 20/4016 |
| 2021/0065170 | A1* | 3/2021 | Shriver | G06Q 20/02 |
| 2021/0065171 | A1* | 3/2021 | Pliasunov | G06Q 20/4016 |
| 2021/0103932 | A1* | 4/2021 | Turgeon | G06Q 30/06 |
| 2021/0165862 | A1* | 6/2021 | Agrawal | G06F 16/2379 |
| 2021/0192524 | A1* | 6/2021 | Saleh | G06Q 20/4016 |
| 2021/0241276 | A1* | 8/2021 | Mossoba | H04L 63/1416 |
| 2021/0304204 | A1* | 9/2021 | Ramesh | G06K 9/6262 |
| 2021/0336952 | A1* | 10/2021 | Margolin | G06N 3/08 |
| 2021/0383391 | A1* | 12/2021 | Barry | G06Q 40/02 |
| 2021/0390385 | A1* | 12/2021 | Saleh | G06Q 20/30 |

OTHER PUBLICATIONS

"How to Send and Receive Money With Facebook Messenger", https://www.thebalance.com/facebook-messenger-payments-send-and-receive-money-315074, Aug. 3, 2020, 19 pages.

"Orders", https://razorpay.com/docs/payment-gateway/orders/, Aug. 3, 2020, 5 pages.

"Payment Flow", https://razorpay.com/docs/payment-gateway/payment-flow/, Aug. 3, 2020, 7 pages.

* cited by examiner

SYSTEMS AND METHODS FOR VERIFYING DIGITAL PAYMENTS

TECHNICAL FIELD

The present disclosure relates to systems and methods for verifying digital payments, and more particularly to, systems and methods for verifying digital service payments using machine learning models to determine whether an authentication is waived.

BACKGROUND

A digital service payment platform can provide convenient person-to-person payments for various services. For example, a recipient (e.g., a passenger) of a transportation service can pay for the service using a digital service payment platform. Upon the completion of the transportation service, the service payment platform can send a payment request to the passenger. The passenger then can submit the payment using the service payment platform, which distributes a portion to the driver. However, many malicious activities can happen on the service payment platform. For example, criminals may first register a fake service provider and a fake service recipient on the service payment platform. The criminals may then create fake service orders and use credit cards of victims to pay the fake services for cashing out moneys. Other malicious activities may include fake payment receipt, fake orders, bank account fraud, etc.

To block the above-mentioned malicious activities, the service payment platform may request service recipients to provide authentication information to verify the online payment. For example, the service payment platform may ask the passenger to enter a preset password or identification (e.g., social security) information before processing the payment transaction. Though the authentication operation can effectively block the malicious activities, frequently requesting the authentication information may significantly deteriorate user experience of the payment services. Therefore, the service payment platform needs to make a balance between the user experience and the digital payment security. How to identify suspicious payment transactions plays a key role for the success of a digital service payment platform.

Embodiments of the disclosure address the above problems by verifying digital service payments using machine learning models to determine whether an authentication can be waived.

SUMMARY

Embodiments of the disclosure provide a system for verifying digital payments for a payment platform. The system includes a communication interface configured to receive service data associated with a transaction from a terminal device associated with a user of the payment platform. The system further includes at least one processor configured to automatically determine whether an authentication is waived for the transaction based on the received service data and a blacklist generated using a machine learning model. The blacklist includes a list of suspicious users and transaction behaviors. The at least one processor further configured to approve the transaction without requesting user authentication information from the terminal device when the authentication is waived. The at least one processor also configured to request the user authentication information from the terminal device and validate the user authentication information when the authentication is not waived.

Embodiments of the disclosure also provide a method for verifying digital payments for a payment platform. The method includes receiving, by a communication interface, service data associated with a transaction from a terminal device associated with a user of the payment platform. The method further includes automatically determining, by at least one processor, whether an authentication is waived for the transaction based on the received service data and a blacklist generated using a machine learning model. The blacklist includes a list of suspicious users and transaction behaviors. The method also includes approving the transaction, by the at least one processor, without requesting user authentication information from the terminal device when the authentication is waived. The method additionally includes requesting the user authentication information from the terminal device and validating, by the at least one processor, the user authentication information when the authentication is not waived.

Embodiments of the disclosure further provide a non-transitory computer-readable medium having instructions stored thereon that, when executed by at least one processor, causes the at least one processor to perform a payment verification method for a payment platform. The method includes receiving service data associated with a transaction from a terminal device associated with a user of the payment platform. The method further includes automatically determining whether an authentication is waived for the transaction based on the received service data and a blacklist generated using a machine learning model. The blacklist includes a list of suspicious users and transaction behaviors. The method also includes approving the transaction without requesting user authentication information from the terminal device when the authentication is waived. The method additionally includes requesting the user authentication information from the terminal device and validating the user authentication information when the authentication is not waived.

It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings.

The disclosed systems and methods automatically determine whether an authentication is waived for an online payment transaction based on received service data and a blacklist generated using machine learning models. If the authentication is waived, the disclosed systems and methods approve the payment transaction without requesting the user authentication information. If the user authentication is not waived, the disclosed systems and methods request the user authentication information and validate the user authentication information. For example, after a transportation service, a passenger submits a payment to a driver through a digital service payment platform. The digital service payment platform includes a risk management device to determine whether authentication information of the passenger is waived and approve the payment transaction directly. The risk management device applies the blacklist generated using machine learning models on received data associated with the service payment. If the passenger and the transaction attributes are not found on the blacklist, the risk management device approves the payment transaction without requiring authentication; otherwise, the risk management device requests the authentication information of the passenger for payment verification. After receiving the passenger authentication information, the risk management device compares the passenger authentication information with known user authentication information and determines whether the transaction is approved.

Figure 1:
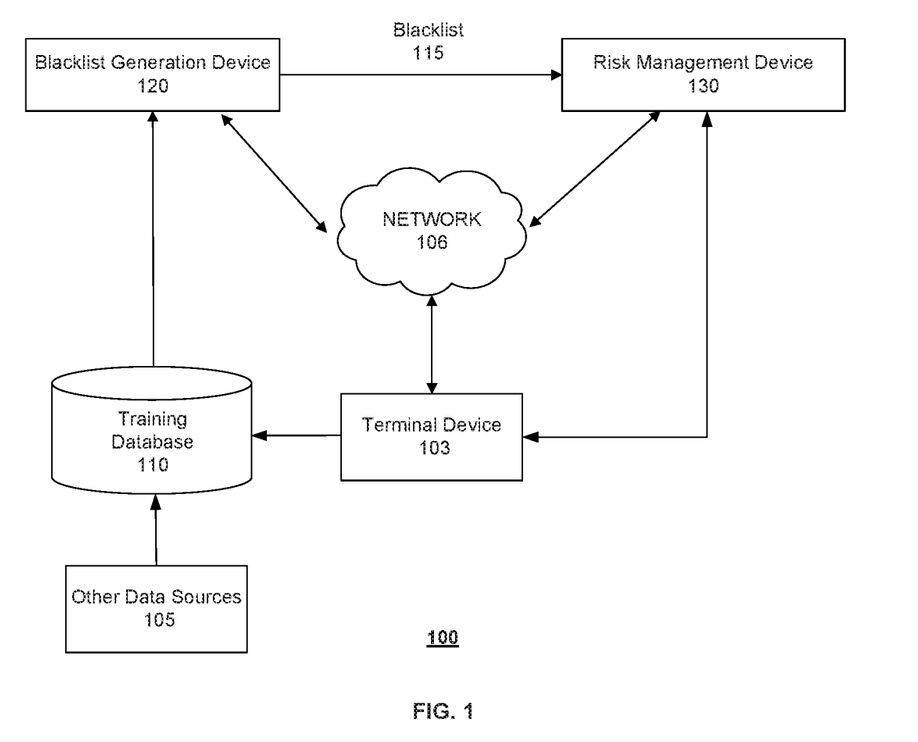
FIG. 1 illustrates an exemplary payment verification system, according to embodiments of the disclosure.

FIG. 1 illustrates an exemplary payment verification system 100 (referred to as "system 100" hereafter), according to embodiments of the disclosure. In some embodiments, system 100 may be configured to automatically verify the service payment submitted by the service user. As shown in FIG. 1, system 100 may include components for performing two phases, a training phase and a payment verification phase. To perform the training phase, system 100 may include a training database 110 and a blacklist generation device 120. To perform the payment verification phase, system 100 may include a risk management device 130. In some embodiments, system 100 may include more or less of the components shown in FIG. 1. For example, when a blacklist 115 is pre-trained and provided, system 100 may include only risk management device 130.

In some embodiments, system 100 may optionally include a network 106 to facilitate the communication among the various components of system 100, such as training database 110, devices 120 and 130, and a terminal device 103. For example, network 106 may be a local area network (LAN), a wireless network, a cloud computing environment (e.g., software as a service, platform as a service, infrastructure as a service), a client-server, a wide area network (WAN), etc. In some embodiments, network 106 may be replaced by wired data communication systems or devices.

In some embodiments, the various components of system 100 may be remote from each other or in different locations, and be connected through network 106 as shown in FIG. 1. In some alternative embodiments, certain components of system 100 may be located on the same site or inside one device. For example, training database 110 may be located on-site with or be part of blacklist generation device 120. As another example, blacklist generation device 120 and risk management device 130 may be inside the same computer or processing device.

As shown in FIG. 1, blacklist generation device 120 may communicate with training database 110 to receive training data. The training data may be collected from multiple sources, e.g., terminal device 103 and other data sources 105. In some embodiments, terminal device 103 may be a mobile phone, a wearable device, a PDA, etc. used by the user (e.g., the passenger) to make a payment for the service. For example, terminal device 103 may collect at least one of transaction information, user profile information, service information associated with the terminal device, time information, or terminal device information. In some embodiments, the transaction information may include a transaction amount, bank account information of a payee (e.g., service provider), bank account information of a payer (e.g., service user), etc. In some embodiments, the user profile information may include a user's name, contact information (e.g., phone number), address, etc. Additionally, each set of user profile data in the training further include the corresponding ground truth safety labels (e.g., safe user or unsafe user). In some embodiments, the service information associated with the terminal device may include the service information received from the terminal device such as a service description, a service start time and end time, a service geographic location, a service provider, a service recipient (e.g., the user), etc. In some embodiments, the time information may include a payment time, a service request time, a service completion time, previous service times, etc. In some embodiments, the terminal device information may include an Internet Protocol (IP) address of the terminal device, a device environmental identifier, etc. Other data sources 105 may include third party vendors (e.g., credit bureaus, data analysis companies), mass media (e.g., newspapers, magazines, the Internet), public records of departments, agencies, and offices of the federal or state governments, etc.

Blacklist generation device 120 may use the training data received from training database 110 to train a list of suspicious users and transaction behaviors (e.g., blacklist 115). In some embodiments, blacklist 115 may include a list of names of the suspicious users. For example, a person with criminal records (e.g., robbery, theft, battery, and assault) may be included in blacklist 115. In some embodiments, blacklist 115 may further include transaction behaviors associated with malicious activities. For example, blacklist 115 may include a transaction behavior of a total transaction amount exceeding $1000 within past 24 hours. This transaction behavior may help detecting malicious activities such as illegal credit card cash out in the form of wallet transfer. As another example, blacklist 115 may include a transaction behavior of a total number of transactions exceeding 5 in the past 24 hours. The threshold numbers are only exemplary and can be determined during training.

In some embodiments, the training phase may be performed "online" or "offline." An "online" training refers to performing the training phase contemporarily with the payment verification phase, e.g., updating blacklist 115 in real-time just prior to determining whether the authentication is waived for the service payment. An "online" training may have the benefit to obtain a most updated blacklist based on the training data that is then available. However, an "online" training may be computational costive to perform and may not always be possible if the training data is large and/or the models are complicate. For example, to avoid the user noticing a time delay, the time needed to complete the payment verification phase can be limited to 200 milliseconds. If the training phase can be completed in milliseconds, "online" training may be implemented before the payment verification phase. Otherwise, an "offline" training is used where the training phase is performed prior to the payment verification phase. The "offline" training may have blacklist 115 updated offline and reused for determining whether the authentication is waived for the service payment. For example, blacklist generation device 120 may update blacklist 115 every hour based on new transaction information and threat intelligence received in a previous hour. After an update, some existing suspicions users in blacklist 115 may be removed from blacklist 115 if these users no longer meet conditions. New users may be added to blacklist 115 if their transaction behaviors meet certain conditions. An exemplary condition may be making more than 6 payments within the past 24 hours.

Blacklist generation device 120 may be implemented with hardware specially programmed by software that performs the training process. For example, blacklist generation device 120 may include a processor and a non-transitory computer-readable medium. The processor may conduct the training by performing instructions of a training process stored in the computer-readable medium. Blacklist generation device 120 may additionally include input and output interfaces to communicate with training database 110, network 106, and/or a user interface (not shown). The user interface may be used for selecting sets of training data, adjusting one or more parameters of the training process, selecting or modifying content of blacklist 115, and/or manually or semi-automatically providing ground-truth associated with a training data (e.g., whether the person associated with certain behaviors is independently confirmed as a suspicious user through other channels).

Blacklist 115 may be used by risk management device 130 to determine whether the authentication is waived for the service payment. Risk management device 130 may receive blacklist 115 from blacklist generation device 120. Risk management device 130 may include a processor and a non-transitory computer-readable medium (discussed in detail in connection with FIG. 2). The processor may perform instructions of a sequence of payment verification processes stored in the medium. Risk management device 130 may additionally include input and output interfaces to communicate with terminal device 103, network 106, and/or a user interface (not shown). The user interface may be used for selecting service data for payment verification, initiating the payment verification process, and displaying a transaction processing result, etc.

Risk management device 130 may communicate with terminal device 103 to receive service data including transaction information, user profile information, service information associated with the terminal device, time information, or terminal device information. Consistent with the present disclosure, the service data may be acquired by terminal device 103. Risk management device 130 may use blacklist 115 received from blacklist generation device 120 to perform one or more of: (1) determining whether the user authentication is waived for the payment transaction, (2) approving the transaction without requesting user authentication information when the authentication is waived, and (3) requesting the user authentication information and validate the user authentication information when the authentication is not waived.

Figure 2:
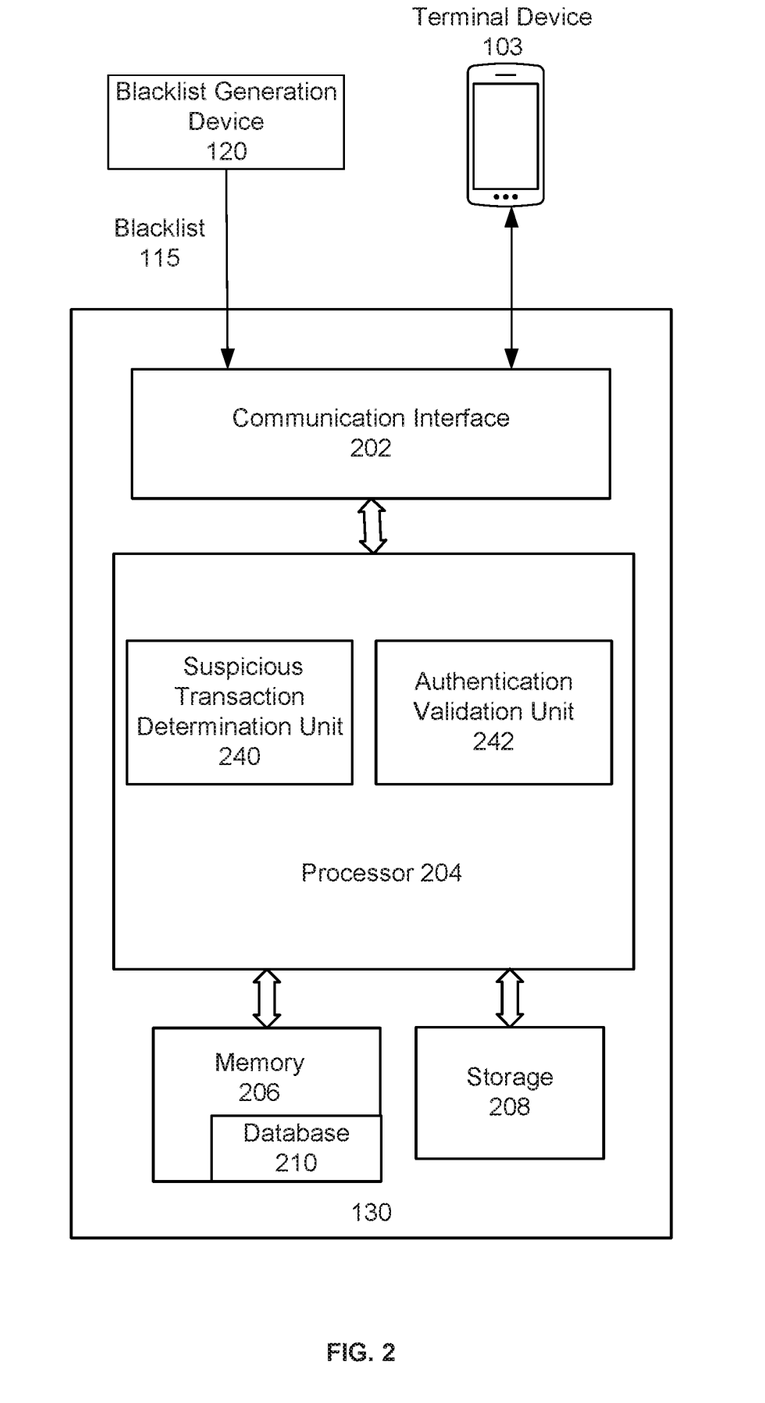
FIG. 2 illustrates a block diagram of an exemplary risk management device, according to embodiments of the disclosure.

For example, FIG. 2 illustrates a block diagram of an exemplary risk management device 130, according to embodiments of the disclosure. Consistent with the present disclosure, risk management device 130 may receive the service data from terminal device 103 and blacklist 115 from blacklist generation device 120. Risk management device 130 may process the service data to determine whether the user authentication is waived. If the user authentication is waived, risk management device 130 may approve the payment transaction without requesting the user authentication from terminal device 103. If the user authentication is not waived, risk management device 130 may request the user authentication from terminal device 103 and validate the user authentication. For example, risk management device 130 may compare the received user authentication with a known user authentication. If the received user authentication matches the known user authentication, risk management device 130 may approve the payment transaction; otherwise, risk management device 130 may block the payment transaction.

In some embodiments, as shown in FIG. 2, risk management device 130 may include a communication interface 202, a processor 204, a memory 206, and a storage 208. In some embodiments, risk management device 130 may include different modules in a single device, such as an integrated circuit (IC) chip (implemented as an application-specific integrated circuit (ASIC) or a field-programmable gate array (FPGA)), or separate devices with dedicated functions. In some embodiments, one or more components of risk management device 130 may be located in a cloud, or may be alternatively in a single location or distributed locations. Components of risk management device 130 may be in an integrated device, or distributed at different locations but communicate with each other through a network (not shown).

Communication interface 202 may send data to and receive data from components such as terminal device 103 and other data sources 105 via communication cables, a Wireless Local Area Network (WLAN), a Wide Area Network (WAN), wireless networks such as radio waves, a cellular network, and/or a local or short-range wireless network (e.g., Bluetooth™), or other communication methods. In some embodiments, communication interface 202 can be an integrated services digital network (ISDN) card, cable modem, satellite modem, or a modem to provide a data communication connection. As another example, communication interface 202 can be a local area network (LAN) card to provide a data communication connection to a compatible LAN. Wireless links can also be implemented by communication interface 202. In such an implementation, communication interface 202 can send and receive electrical, electromagnetic or optical signals that carry digital data streams representing various types of information via a network.

Consistent with some embodiments, communication interface 202 may receive service data (e.g., transaction information) from terminal device 103. Communication interface 202 may further receive the user authentication data (e.g., salted and hashed password, token, or credentials) from terminal device 103 when the user authentication is not waived based on the initial determination using received service data. Communication interface 202 may also provide the received data to storage 208 for storage or to processor 204 for processing.

Processor 204 may be a processing device that includes one or more general processing devices, such as a microprocessor, a central processing unit (CPU), a graphics processing unit (GPU), and the like. More specifically, processor 204 may be a complex instruction set computing (CISC) microprocessor, a reduced instruction set computing (RISC) microprocessor, a very long instruction word (VLIW) microprocessor, a processor running other instruction sets, or a processor that runs a combination of instruction sets. Processor 204 may also be one or more dedicated processing devices such as application specific integrated circuits (ASICs), field programmable gate arrays (FPGAs), digital signal processors (DSPs), system-on-chip (SoCs), and the like.

Processor 204 may be configured as a separate processor module dedicated to performing payment verification based on the service data (and the user authentication if not waived) received from terminal device 103. Alternatively, processor 204 may be configured as a shared processor module for performing other functions. Processor 204 may be communicatively coupled to memory 206 and/or storage 208 and configured to execute the computer-executable instructions stored thereon.

Memory 206 and storage 208 may include any appropriate type of mass storage provided to store any type of information that processor 204 may need to operate. Memory 206 and storage 208 may be a volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM. In some embodiments, memory 206 may include an in-memory database 210 (e.g., Redis) for attaining minimal response time (e.g., microseconds) by eliminating the need to access disks (e.g., storage 208). For example, blacklist 115 may be stored in in-memory database 210 to minimize determination time that whether an authentication is waived. Memory 206 and/or storage 208 may be configured to store one or more computer programs that may be executed by processor 204 to perform service data processing and payment verification disclosed herein. For example, memory 206 and/or storage 208 may be configured to store program(s) that may be executed by processor 204 to determine whether the user authentication is waived based on the received service data from terminal device 103, and process the payment transaction according to the determination.

Memory 206 and/or storage 208 may be further configured to store information and data used by processor 204. For instance, memory 206 and/or storage 208 may be configured to store the various types of data (e.g., service data) from terminal device 103 and data related to location and setting of terminal device 103. Memory 206 may store intermediate data such as information generated based on the service data for comparing with keys in blacklist 115. Memory 206 may further store known authentication information of the users. Storage 208 may store various logs for reporting or business intelligence (BI) purposes. The various types of data may be stored permanently, removed periodically, or disregarded immediately after each frame of data is processed.

As shown in FIG. 2, processor 204 includes multiple modules, such as a suspicious transaction determination unit 240, an authentication validation unit 242, and the like. These modules (and any corresponding sub-modules or sub-units) can be hardware units (e.g., portions of an integrated circuit) of processor 204 designed for use with other components or software units implemented by processor 204 through executing at least part of a program. The program may be stored on a computer-readable medium, and when executed by processor 204, it may perform one or more functions. Although FIG. 2 shows units 240 and 242 both within one processor 204, it is contemplated that these units may be distributed among multiple processors located near or remotely with each other.

Figure 3:
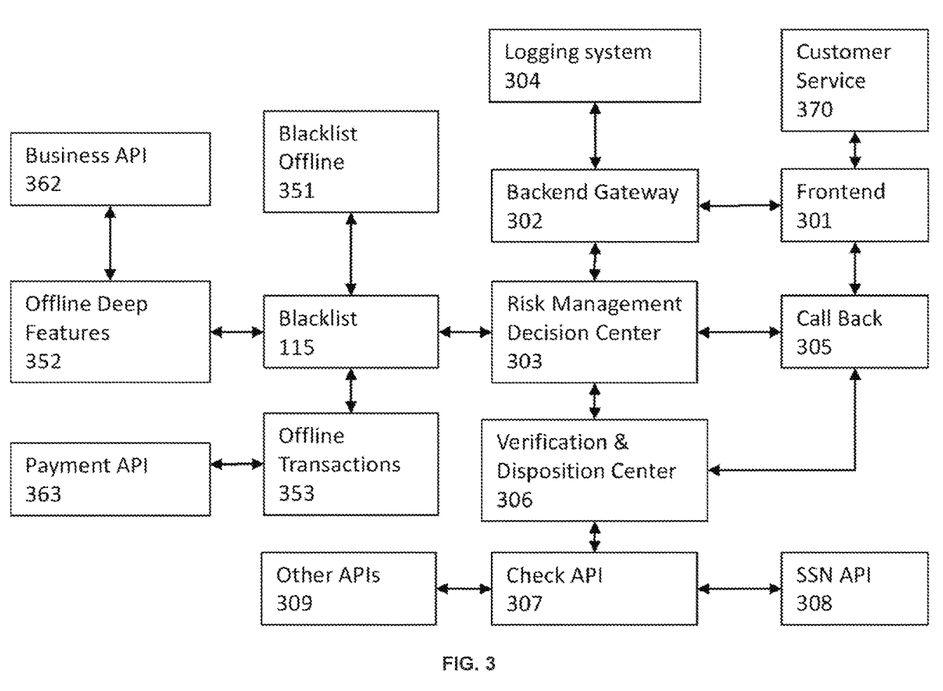
FIG. 3 is a flowchart of an exemplary payment verification process, according to embodiments of the disclosure.
Figure 4:
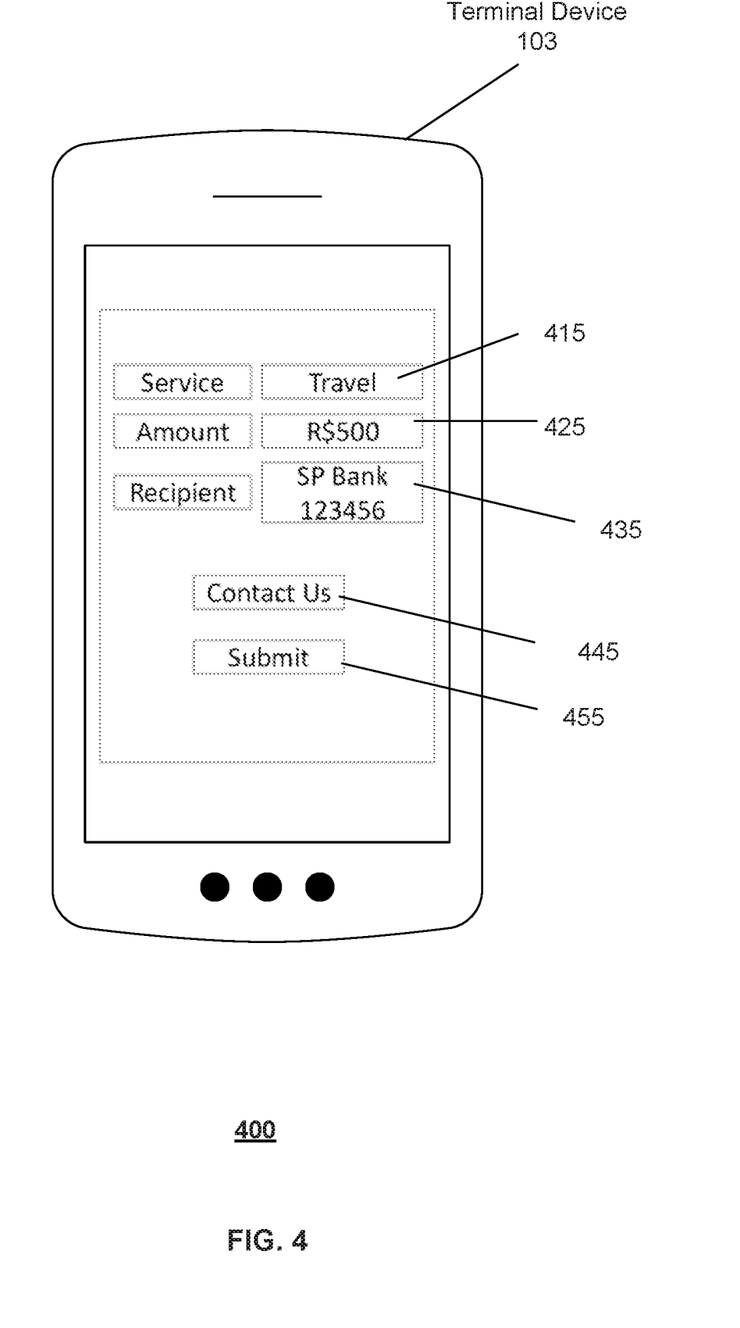
FIG. 4 illustrates an exemplary user interface for making a service payment, according to embodiments of the disclosure.

In some embodiments, units 240 and 242 of FIG. 2 may execute computer instructions to perform payment verification. FIG. 3 is a flowchart of an exemplary payment verification process, according to embodiments of the disclosure. In some embodiments, the user may use the terminal device (e.g., terminal device 103) to log onto a frontend (e.g., frontend 301) of the service payment platform to submit the service payment. For example, FIG. 4 illustrates an exemplary user interface 400 for making a service payment, according to embodiments of the disclosure. As shown in FIG. 4, user interface 400 (as an example of frontend 301) allows the user to provide service information 415, a payment amount 425, and recipient information 435. Service information 415 can include a brief description of the service, such as travel, utility, childcare, landscaping, etc. Payment amount 425 includes a monetary amount (e.g., dollar) paid for the service. Recipient information 435 include the service user's bank information (e.g., bank name, bank account type, account number, etc.). It is contemplated that user interface 400 may request information other than above mentioned. For example, user interface 400 may further request a service order number, detailed service description, service provider's name, etc. The user may input the information by any suitable means, such as typing, selecting from a dropdown list, etc. As shown in FIG. 4, user interface 400 may also include a button (e.g., button 445) for assisting the service user to contact a customer service department before submitting the service payment. The service user may click a button (e.g., button 455) to submit the service payment.

Returning to FIG. 3, when the service user clicks button 445 in FIG. 4, a Contact entrance for customer service purposes may be provided to help the user with any technical difficulties such as time out or unstable signals. In some embodiments, when the service user clicks button 455 in FIG. 4, the service data including the service payment information is sent to a backend gateway 302 from frontend 301. Consistent with the present disclosure, the service data may include the transaction information collected by user interface 400 (e.g., service information, the transaction amount, and service recipient information), the user profile, the previous service information (e.g., travel history), the service geographic location, the IP address of terminal device 103, or the device environmental identifier. In some embodiments, backend gateway 302 may receive the service data and distribute the received data into multiple places. For example, backend gateway 302 may send the service data logs to a logging system 304 for future reporting and BI purposes. Logging system 304 may be further used for training new machine learning models and updating blacklist 115. The service data may also be sent to a risk management decision center 303 (referred to as "center 303" hereafter).

In some embodiments, center 303 may employ suspicious transaction determination unit 240 to compare the received service data with blacklist 115. For example, blacklist 115 may include a list of suspicious user identifiers (ID) (e.g. user names), a threshold of transaction amount, a list of suspicious IP addresses, and a list of suspicious transaction locations. As shown in FIG. 3, blacklist 115 is generated based on training data such as blacklist offline 351, offline deep features 352, and offline transactions 353. Consistent with some embodiments, blacklist offline 351 may include a list of suspicious users with criminal charges (e.g., robbery, theft, battery, and assault). In some embodiments, the data may be periodically collected from the government resources. Blacklist offline 351 may further include a list of suspicious users with financial issues (e.g., loan default, bankruptcy, and the like) obtained from third party credit bureaus.

In some embodiments, offline deep features 352 are generated using machine learning models including a deep learning model, a rule-based model, or a support vector machine (SVM). The machine learning models may be trained based on training data in training database 110. In some embodiments, offline deep features 352 may include a user ID, a transaction amount threshold, a transaction frequency, a transaction location, a terminal device IP address, a user credit score, etc. Blacklist generation device 120 may provide offline deep features 352 through a business application programming interface (API) 362. For example, blacklist generation device 120 may train a machine learning model (e.g., a deep learning classification model) to classify existing service users into a group of suspicious users and a group of safe users. The suspicions users may be added to blacklist 115 for requiring the authentication information to verify the payment. Similarly, blacklist generation device 120 may apply another machine learning model (e.g., a rule-based model) on data of offline transactions 353 (e.g., transaction amount, transaction location, or transaction frequency) to generate rules of suspicious transaction behaviors. For example, an exemplary rule may be that if the transaction frequency exceeds 6 times for a single user within past 24 hours, the authentication information is required. In some embodiments, offline transactions 353 may be obtained through a payment API 363 from other data sources 105 or terminal device 103.

In some embodiments, suspicious transaction determination unit 240 may be configured to generate a set of corresponding keys based on the received service data from terminal device 103 for comparing with the keys in blacklist 115. Consistent with some embodiments, the keys in blacklist 115 may be a list of suspicious users and transaction behaviors. For example, suspicious transaction determination unit 240 may extract the user ID and the transaction amount from the received service data. If the extracted user ID matches any of user IDs listed in blacklist 115, suspicious transaction determination unit 240 may generate a call back 305 to request the user to enter the authentication information in frontend 301. Similarly, if the transaction amount exceeds the threshold transaction amount listed in blacklist 305, suspicious transaction determination unit 240 may generate call back 305 to request the user to enter the authentication information in frontend 301.

Figure 5:
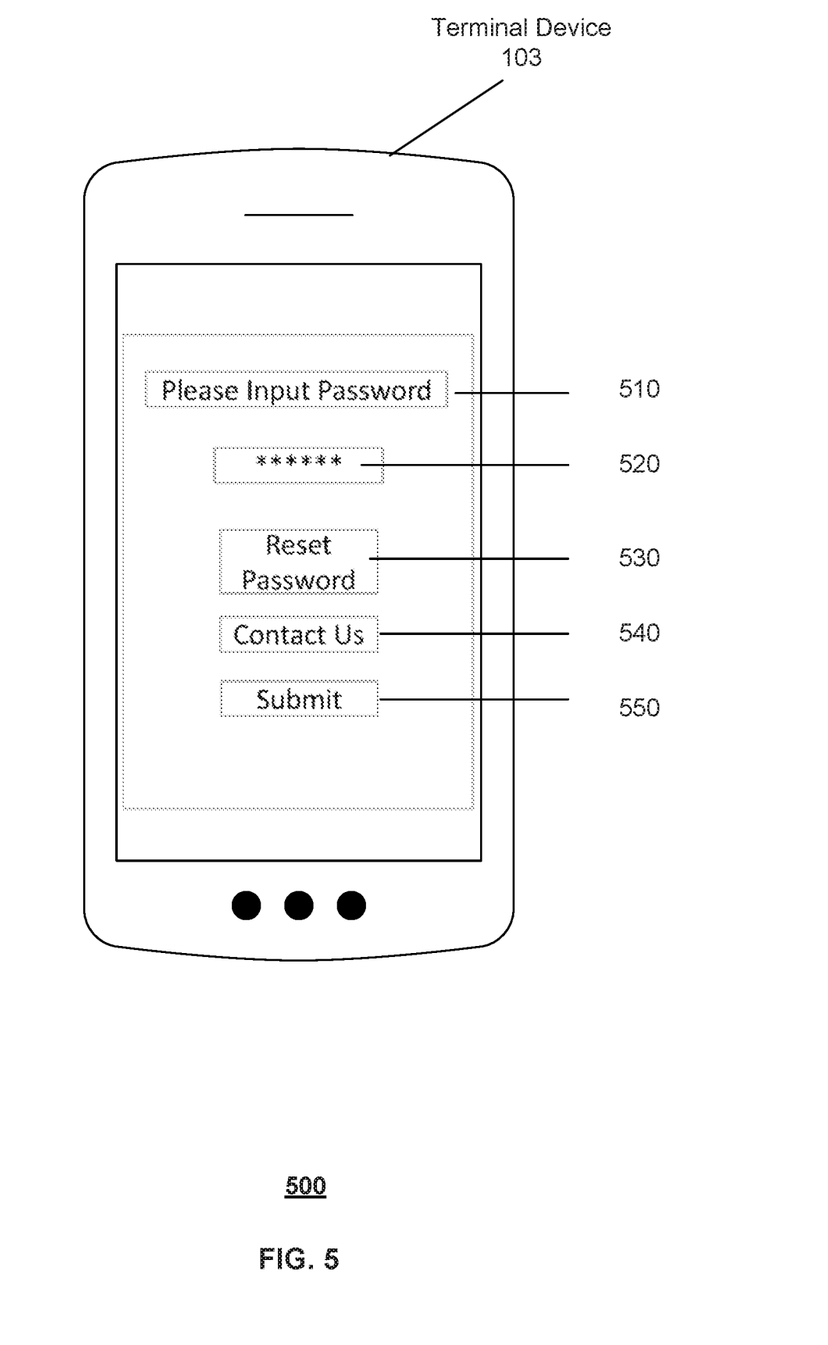
FIG. 5 illustrates an exemplary user interface for requesting an authentication, according to embodiments of the disclosure.

FIG. 5 illustrates an exemplary user interface 500 for requesting an authentication, according to embodiments of the disclosure. As shown in FIG. 5, user interface 500 of frontend 301 includes an authentication description 510, an authentication input field 520, a reset button 530, a contact us button 540, and a submit button 550. In some embodiments, authentication description 510 describes what type of authentication is required to enter in authentication input field on user interface 500. For example, as shown in FIG. 5, a password is required for verifying the payment. Consistent with the present disclosure, other types of authentication such as SSN or biometric information (e.g., fingerprint, face with/without masks, voice, and the like) can be acceptable authentications. For example, if the password information is not stored or available in memory 206, processor 204 may request to enter the SSN of the user in authentication input field 520 for verifying the payment. If the user forgets the authentication, the user can use reset button 530 to reset the authentication. For example, if the user forgets the password, he can press reset button 530, which will prompt him to follow certain steps for resetting the password. If the user wants to contact the customer service department before submitting the authentication, the user can use contact us button 540 to reach the customer service department. After entering the authentication, the user may use submit button 550 to submit the authentication information from frontend 301 to backend gateway 302.

Returning to FIG. 3, when the service user clicks contact us button 540 in FIG. 5, Contact entrance for customer service purposes may be provided to help the user with any technical difficulties such as time out or unstable signals. In some embodiments, backend gateway 302 may send the received data to logging system 304 for reporting and BI purposes. Backend gateway 302 may further send the received data to center 303. In some embodiments, center 303 may send the data to a verification and disposition center 306 for validating the received authentication information. For example, verification and disposition center 306 may employ authentication validation unit 242 in risk management device 130 to compare the received authentication information from frontend 301 with the stored authentication information in memory 206. Authentication validation unit 242 may retrieve the stored user authentication information through a check API 307, and compare the retrieved user authentication with the received authentication information from terminal device 103. Depending on the type of authentication information, check API may call the corresponding APIs (e.g., SSN API 308, or other APIs 309) to complete the authentication comparison as shown in FIG. 3. If the received authentication information matches the retrieved authentication, verification and disposition center 306 may approve the transaction by sending call back 305 including a transaction approval message to frontend 301. If the received authentication information does not match the retrieved authentication, verification and disposition center 306 may block the transaction of the service payment by sending call back 305 including a disapproval message to frontend 301. A transaction block message may display on terminal device 103.

Figure 6:
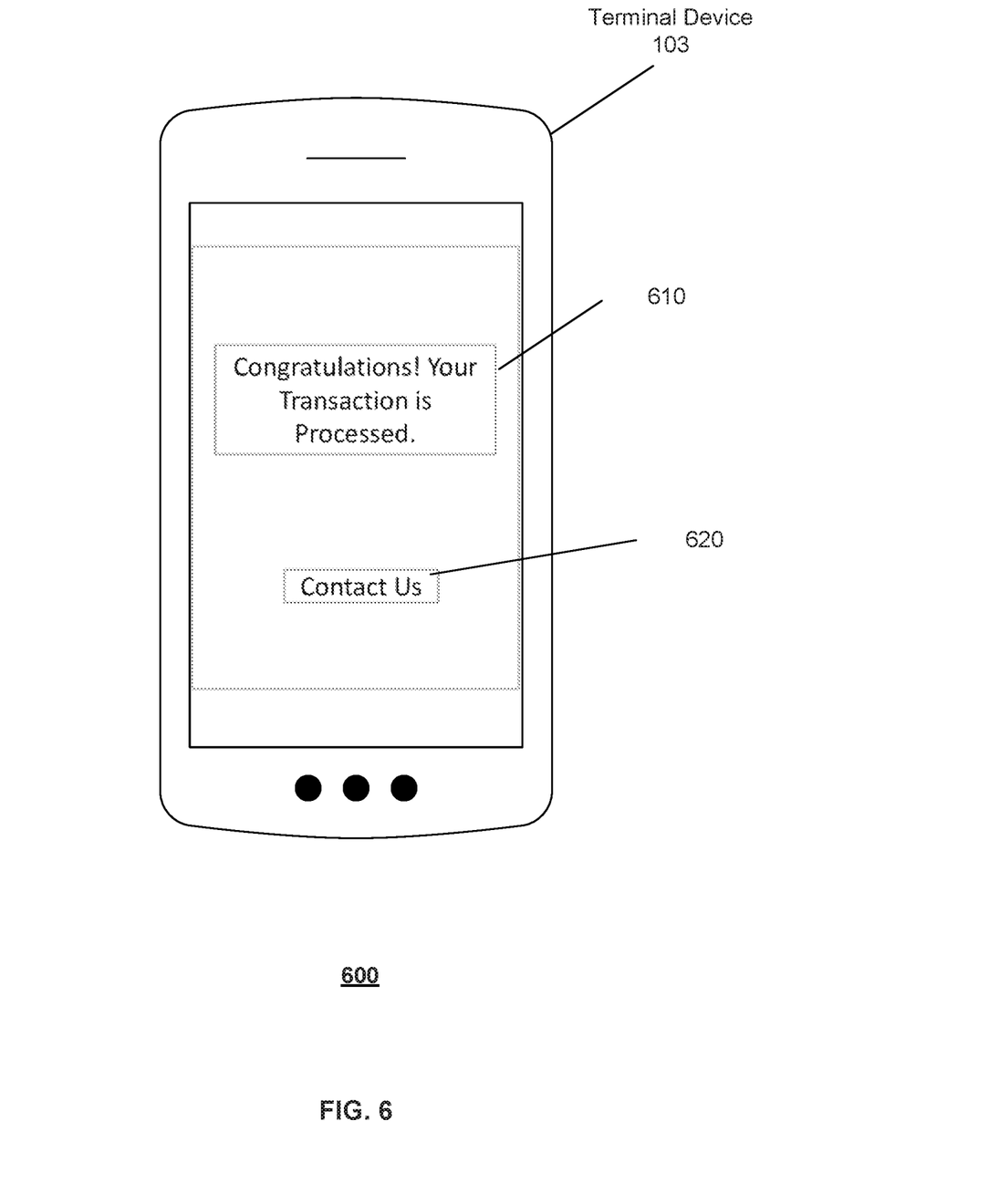
FIG. 6 illustrates an exemplary user interface for displaying a transaction processing result, according to embodiments of the disclosure.

For example, FIG. 6 illustrates an exemplary user interface 600 for displaying a transaction processing result, according to embodiments of the disclosure. As shown in FIG. 6, user interface 600 displays a message of transaction being processed in a field 610. The message indicates the transaction is approved by verification and disposition center 306. User interface 600 may further include a contact us button 620 for providing the CPO entrance for customer service purposes to help the user with any technical difficulties such as time out or unstable signals.

In some embodiments, center 303 may waive the authentication for the transaction when the received server data of the transaction does not match any keys in blacklist 115. Center 303 may then send call back 305 including the transaction approval message to frontend 301, and user interface 600 may display the message of transaction being processed on terminal device 103 as shown in FIG. 6. If the transaction is not approved, the message displayed in field 610 may be changed accordingly to reflect the result.

Figure 7:
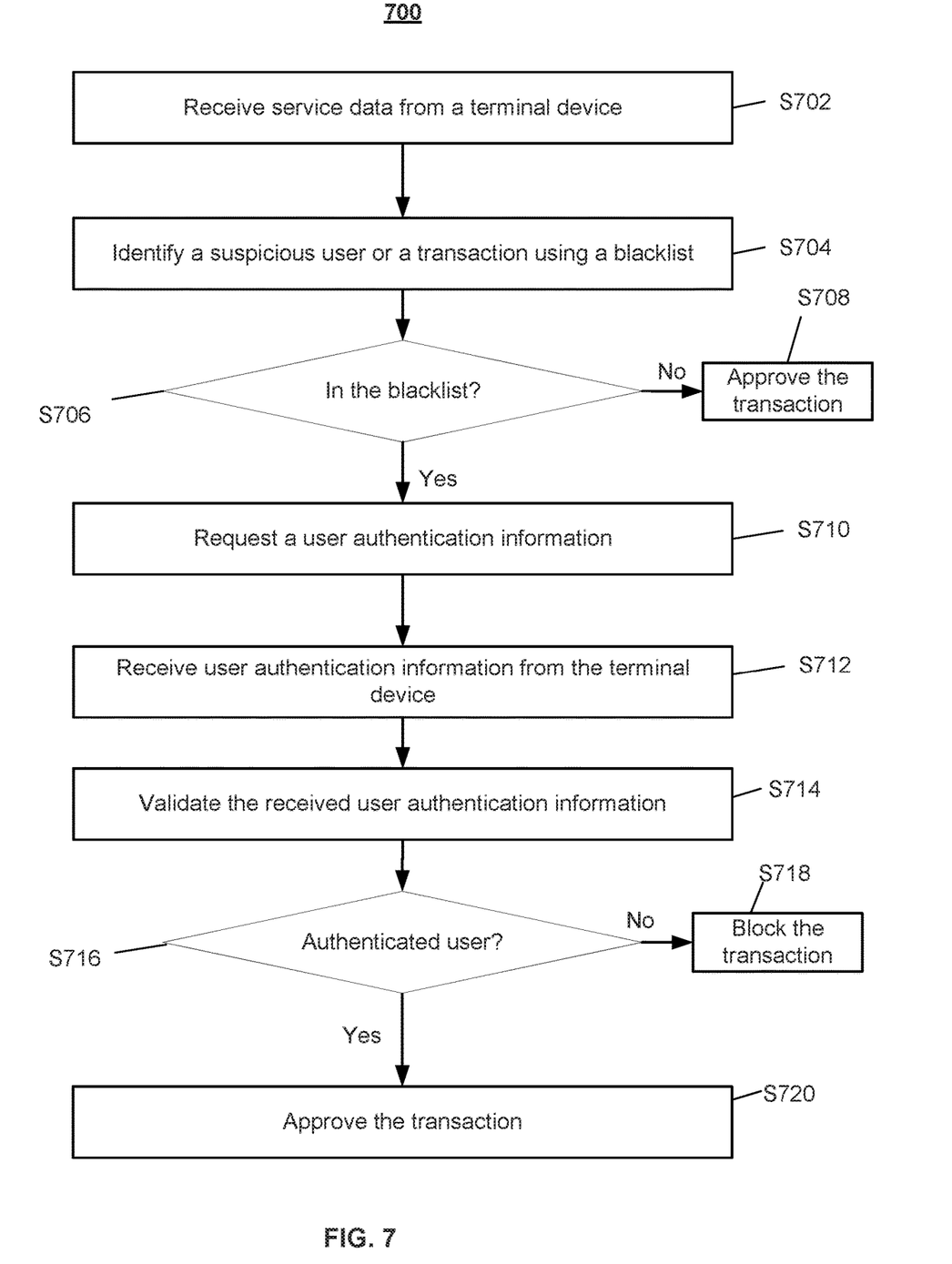
FIG. 7 is a flowchart of an exemplary method for verifying a service payment, according to embodiments of the disclosure.

FIG. 7 is a flowchart of an exemplary method 700 for verifying a service payment, according to embodiments of the disclosure. Method 700 may be performed by risk management device 130 and particularly processor 204 or a separate processor not shown in FIG. 2. Method 700 may include steps S702-S720 as described below. It is to be appreciated that some of the steps may be optional, and some of the steps may be performed simultaneously, or in a different order than shown in FIG. 7.

In step S702 of FIG. 7, risk management device 130 may be configured to receive service data from terminal device 103. Consistent with the present disclosure, the service data may include the transaction amount, service information, and service recipient information. For example, for a transportation service, the service data may include a transportation expense (e.g., trip fare), a service content description, a passenger name, and a payment method. The service data may further include the user (e.g., service recipient) profile, the information of the previous trips, the geographical location of the service, the IP address of terminal device 103, or the environmental identifier of terminal device 103.

In step S704, risk management device 130 may be configured to determine whether a user authentication information is waived for the transaction based on the received service data and blacklist 115. Consistent with the present disclosure, blacklist 115 may be trained by blacklist generation device 120 using the machine learning models (e.g., deep learning models, rule-based models, SVMs, and the like). Blacklist 115 may include a list of suspicious users and transaction behaviors. In some embodiments, blacklist generation device 120 may retrain each machine learning model at a predetermined frequency. Blacklist 115 therefore may be updated periodically based on the retrained machine learning models. For example, blacklist generation device 120 may retrain the transaction related models every hour. Blacklist 115 therefore can include an updated transaction pattern and exclude an outdated transaction pattern when determining whether the payment the user authentication information is waived for a new transaction.

If the service data does not match keys on blacklist 115 (step S706: No), risk management device 130 may approve the transaction in step S708. If the service data match any key (e.g., suspicious user name, transaction amount threshold) in blacklist 115 (step S706: Yes), risk management device 130 may be configured to request the user authentication information for verifying the payment. For example, the service user's name may match a suspicious user name listed in blacklist 115, the transaction amount may exceed a transaction amount threshold listed in blacklist 115, or the combination of multiple blacklists. The list of suspicious users and the transaction amount threshold may be generated using different machine learning models trained by blacklist generation device 120 at different frequencies.

In step S710, risk management device 130 may be configured to send a request to terminal device 103 to collect the user authentication information. In some embodiments, risk management device 130 may be further configured to determine what type of user authentication information to request, which may depend on the known user authentication information stored in risk management device 130. For example, if the user has created a password, risk management device 130 may request the password as the user authentication information. If the user did not create a password, risk management device 130 may request other types of user authentication information for verifying the payment, such as an SSN or a driver's license number.

In step S712, risk management device 130 may be configured to receive the user authentication information from terminal device 103. Consistent with the present disclosure, the user authentication information may include a password, an SSN, or user biometrics (e.g., fingerprint, face, voice, and the like).

In step S714, risk management device 130 may be configured to validate the received user authentication information. For example, risk management device 130 may compare the received user authentication information with the known user authentication information. The known user authentication information may be provided by the user before the transaction is stored in memory 206 of risk management device 130.

If the received user authentication information does not match the known user authentication information stored in risk management device 130 (step S716: No), risk management device 130 may block the transaction of the service payment in step S718. If the received user authentication information matches the known user authentication information stored in risk management device 130 (step S716: Yes), risk management device 130 may approve the transaction of the service payment in step S720.

Although the some of the embodiments are described in the context of a transportation service provided to a passenger and the passenger being the service use who uses the service payment platform to pay for the service, it is contemplated that the disclosed embodiments can be applied or adapted for verifying payments to other types of services submitted by other types of service users. For example, the service may be childcare, landscaping, HVAC maintenance, house repairs, food and beverage service, etc. The disclosed embodiments may be further applied or adapted for verifying payments for non-services, such as merchandises, utilities, performances, etc.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

What is claimed is:

1. A payment verification system for a payment platform, comprising:
   a communication interface configured to receive service data associated with a transaction from a terminal device associated with a user of the payment platform, wherein the service data associated with the transaction comprises a transaction amount, service information, and recipient information;
   at least one processor coupled to a memory and configured to:
   generate a blacklist using a machine learning model, wherein the blacklist includes a set of keys associated with suspicious users and transaction behaviors;
   maintain the blacklist in the memory;
   automatically determine whether an authentication is waived for the transaction by comparing the transaction amount, the service information, and the recipient information included in the service data received from the terminal device with the set of keys associated with the suspicious users and the transaction behaviors included in the blacklist, wherein the authentication is waived when the transaction amount, the service information, and the recipient information do not match any key of the set of keys included in the blacklist, and wherein the authentication is not waived when at least one of the transaction amount, the service information, and the recipient information match one or more keys of the set of keys included in the blacklist;

approve the transaction without requesting user authentication information from the terminal device when the authentication is waived; and request and receive the user authentication information from the terminal device and validate the user authentication information when the authentication is not waived.

2. The payment verification system of claim 1, wherein the user authentication information includes at least one of a password, a social security number (SSN), or biometrics information.

3. The payment verification system of claim 1, wherein the service data associated with the transaction further comprises at least one of a user profile, previous trips, geo-locations, an Internet Protocol (IP) address of the terminal device, or an environmental identifier of the terminal device.

4. The payment verification system of claim 1, the at least one processor is further configured to:

approve the transaction when the user authentication information is validated; and block the transaction when the user authentication information fails to validate.

5. The payment verification system of claim 1, wherein the communication interface is further configured to:

send a validation result of the received user authentication information to the terminal device.

6. The payment verification system of claim 1, wherein to validate the user authentication information, the at least one processor is further configured to:

compare the received user authentication information with known user information; and validate the user authentication information based on whether it matches the known user information.

7. The payment verification system of claim 1, wherein the machine learning model is trained based on sample transaction data of labeled users, wherein the sample transaction data includes at least one of transaction information, user profile information, service information associated with the terminal device, time information, or terminal device information.

8. The payment verification system of claim 1, wherein the machine learning model is retrained at a predetermined frequency.

9. The payment verification system of claim 8, wherein the blacklist is updated periodically using the retrained machine learning model.

10. The payment verification system of claim 1, wherein the machine learning model is at least one of a deep learning model, a rule-based model, or a support vector machine (SVM).

11. A payment verification method for a payment platform, comprising:

receiving, by a communication interface of a processing device, service data associated with a transaction from a terminal device associated with a user of the payment platform, wherein the service data associated with the transaction comprises a transaction amount, service information, and recipient information;

generating, by at least one processor of the processing device, a blacklist using a machine learning model, wherein the blacklist includes a set of keys associated with suspicious users and transaction behaviors;

maintaining, by the at least one processor of the processing device, the blacklist in a memory of the processing device;

automatically determining, by the at least one processor of the processing device, whether an authentication is waived for the transaction by comparing the transaction amount, the service information, and the recipient information included in the service data received from the terminal device with the set of keys associated with the suspicious users and the transaction behaviors included in the blacklist, wherein the authentication is waived when the transaction amount, the service information, and the recipient information do not match any key of the set of keys included in the blacklist, and wherein the authentication is not waived when at least one of the transaction amount, the service information, and the recipient information match one or more keys of the set of keys included in the blacklist;

approving the transaction, by the at least one processor of the processing device, without requesting user authentication information from the terminal device when the authentication is waived; and requesting and receiving, by the at least one processor of the processing device, the user authentication information from the terminal device and validating, by the at least one processor of the risk management device processing device, the user authentication information when the authentication is not waived.

12. The payment verification method of claim 11, wherein the user authentication information includes at least one of a password, a social security number (SSN), or biometrics information.

13. The payment verification method of claim 11, wherein the service data associated with the transaction further comprises at least one of a user profile, previous trips, geo-locations, an Internet Protocol (IP) address of the terminal device, or an environmental identifier of the terminal device.

14. The payment verification method of claim 11, further comprising:

approving the transaction, by the at least one processor of the processing device, when the user authentication information is validated; and blocking the transaction, by the at least one processor of the processing device, when the user authentication information fails to validate.

15. The payment verification method of claim 11, further comprising:

sending, by the communication interface of the processing device, a validation result of the received user authentication information to the terminal device.

16. The payment verification method of claim 11, wherein validating the user authentication information further comprises:

compare the received user authentication information, by the at least one processor of the processing device, with known user information; and validating the user authentication information, by the at least one processor of the processing device, based on whether it matches the known user information.

17. The payment verification method of claim 11, wherein the machine learning model is trained based on sample transaction data of labeled users, wherein the sample transaction data includes at least one of transaction information, user profile information, service information associated with the terminal device, time information, or terminal device information.

18. The payment verification method of claim 11, wherein the machine learning model is retrained at a predetermined frequency, wherein the blacklist is updated periodically using the retrained machine learning model.

19. The payment verification method of claim 11, wherein the machine learning model is at least one of a deep learning model, a rule-based model, or a support vector machine (SVM).

20. A non-transitory computer-readable medium having instructions stored thereon that, when executed by at least one processor, causes the at least one processor to perform a payment verification method for a payment platform, the payment verification method comprising:
   receiving service data associated with a transaction from a terminal device associated with a user of the payment platform, wherein the service data associated with the transaction includes transaction amount, service information, and recipient information;
   generating a blacklist using a machine learning model, wherein the blacklist includes a set of keys associated with suspicious users and transaction behaviors;
   maintaining the blacklist in a memory associated with the payment platform;
   automatically determining whether an authentication is waived for the transaction by comparing the transaction amount, the service information, and the recipient information included in the service data received from the terminal device with the set of keys associated with the suspicious users and the transaction behaviors included in the blacklist, wherein the authentication is waived when the transaction amount, the service information, and the recipient information do not match any key of the set of keys included in the blacklist, and wherein the authentication is not waived when at least one of the transaction amount, the service information, and the recipient information match one or more keys of the set of keys included in the blacklist;
   approving the transaction without requesting user authentication information from the terminal device when the authentication is waived; and
   requesting and receiving the user authentication information from the terminal device and validating the user authentication information when the authentication is not waived.

* * * * *